ved June 28, 1960

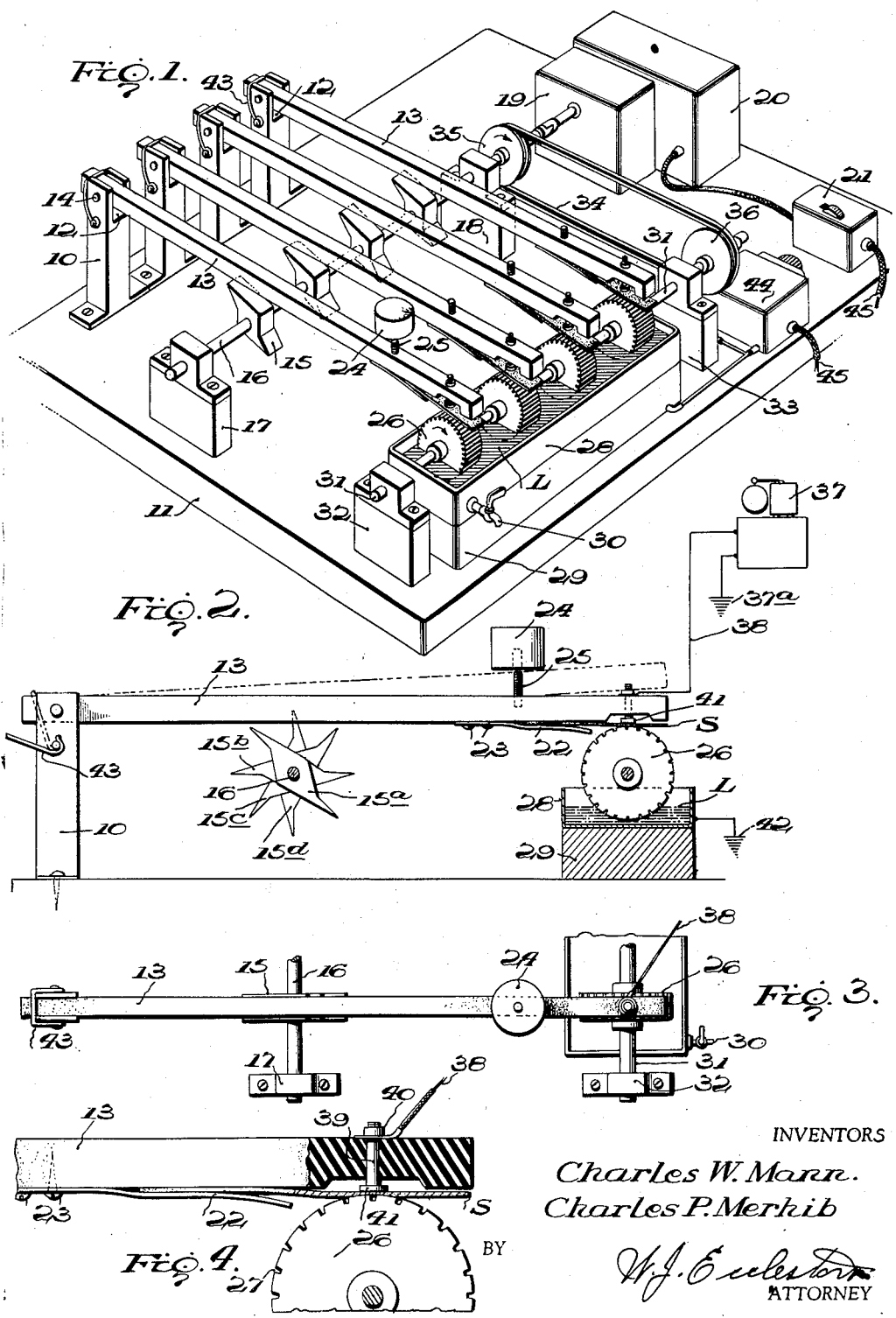

2,942,463

DYNAMIC TAPPING TESTER FOR MEASURING WATER PENETRATION

Charles W. Mann, Framingham, and Charles P. Merhib, Worcester, Mass., assignors to the United States of America as represented by the Secretary of the Army Filed Jan. 18, 1957, Ser. No. 635,564

8 Claims. (Cl. 73—159)

(Granted under Title 35, U.S. Code (1952), sec. 266)

The invention described herein, if patented, may be manufactured and used by or for the Government for governmental purposes, without the payment to us of any royalty thereon.

This invention relates to an apparatus for dynamically testing certain fabrics to determine their resistance to penetration by water and other liquids. The primary object is to provide means which will make it possible to evaluate different treated and untreated leathers in a short time and with a correlation with field results that is superior as compared with other methods known to us. An ancillary object is to provide apparatus which may test several specimens simultaneously. Other objects are to provide apparatus which is inexpensive to build and maintain in good running order, which is adaptable and which subjects the fabrics to a mild abrasive action concomitantly with the wetting.

In the accompanying drawings forming a part of this specification and showing a preferred form of apparatus, Figure 1 is a perspective view of the apparatus constructed to test four fabric specimens simultaneously, some wiring being omitted for convenience of illustration;

Figure 2 is a vertical sectional elevation showing two positions of the arms, also showing four cams out of phase for lifting four arms, the buzzer circuit being shown diagrammatically;

Figure 3 is a fragmentary top plan view; and

Figure 4 is an enlarged fragmentary vertical section.

In general, the preferred apparatus comprises a pivoted arm supporting a specimen of the fabric to be tested, a power-rotated wheel dipping into a bath of water or other liquid and providing a wet anvil which the specimen forcibly contacts, means for rocking the arm so as to alternately lift the specimen off the anvil and then allow it to drop to contact the wet anvil, and an electrical circuit including a device which gives a signal when the specimen has been penetrated by the liquid to allow the circuit to be completed through the specimen.

Referring particularly to the drawings, the preferred apparatus comprises a plurality of identical testing units, only four of which are shown in Figure 1, for drafting convenience. Each unit includes a pedestal 10 secured to a platform or table 11, the pedestal being bifurcated or slotted at its upper end, as shown at 12, to receive an arm 13 which swings in a vertical plane on a pivot pin 14. A power-driven double cam 15 located beneath arm 13 alternately lifts the arm and lets it fall as the test proceeds; cam 15 is fixed to a horizontal shaft 16 journaled in bearings in pillow blocks 17, 18 fixed to the platform or table 11. Shaft 16 is driven at slow speed by a gear train enclosed in a casing 19, and the gear train is driven by an electric motor 20 controlled by a switch 21, with the necessary connections to a source of electric power, as the legend shows.

Arm 13 carries a resilient spring clip 22 secured at one end as by screws 23 to the underside of the arm a short distance from its free end. A specimen S of leather or other fabric to be tested is firmly gripped by the spring clip when a test is being made. Obviously specimens of different thicknesses may be accommodated by the spring clip, which is pulled down by the fingers of the operator to receive or release a specimen. The weight of arm 13 (which may be increased by adding metal weight 24 of different masses, secured on top of the arm by a stud 25) presses specimen S against the periphery of the rotating anvil 26. The anvil is a metal wheel preferably having shallow grooves 27 about 1/32 in. deep and 1/32 in. wide and extending transversely across the periphery of the wheel. These grooves aid in picking up a film of water or other liquid from the trough or tank 28 in which the wheel is partly immersed; also the grooves effect a slight abrasion of the specimen. If the specimen is a textile fabric, not usually subject to abrasion as sole leather is, the wheel 26 may be superseded by a wheel having a smooth periphery, not shown. Tank 28 is mounted on a block 29 fixed to the platform or table 11 and has a spigot 30 at one end for draining off the liquid. A shaft 31, journaled in pillow blocks 32, 33 supported on table 11, drives the rotating anvil 26 at a slow speed, preferably the speed of shaft 16, a V-belt 34 and V-pulleys 35, 36 providing the power connection.

The electrical circuit includes a buzzer or other annunciator 37, one side of which is grounded as shown at 37a, a lead 38 connecting the buzzer with a metal pin 39 which is passed through a bore in arm 13, nut 40 securing and electrically connecting the end of the lead to the pin, and a hammer 41 (which is a flat metal disk) fixed to the lower end of the pin. The hammer 41 continually strikes the specimen S as the machine operates, thus forcing it against the film of water etc. on the rotating anvil. This film of liquid will conduct electricity and the liquid L in the tank will also carry a small current. A ground 42 is coupled to the walls of the tank, if the walls are a good conductor, or extends into the tank, if the tank walls are non-conductive. A pair of leads 45 connect the circuit with a source of electricity. The circuit is completed when liquid from the film on the rotating anvil penetrates the pores or the fibers of the specimen, which is directly in contact with both the anvil and the hammer each time the arm drops down. The electronic switch 44 then causes the buzzer 37 to sound a signal, and the operator notes by means of a stop watch the time elapsed from the starting of the test to the moment the signal is seen or heard. While Figure 4 shows the specimen S as partly abraded from its contact with the rotating anvil, in many cases no observable wear of the specimen is noted after the test is completed.

An arm holder or clip 43 is moved by the operator to hold each arm 13 free of its actuating cam 15 when the arm is not being used in a test. This makes it convenient to insert and remove the specimen.

When there are four testing units as illustrated in Figure 1, the four double cams 15 should be out of phase, that is, so located on shaft 16 that no two arms 13 rise and fall at the same instant. This will obviate jarring of the table etc. Thus if the front or nearest cam 15a (Figure 2) has its axis at 135° and 315°, as indicated, the second cam from the front 15b may have its axis at 0° and 180°, the third cam 15c may have its axis at 45° and 225°, while the fourth or rearmost cam 15d may have its axis at 90° and 270°. All four testing units may then be connected by wires to a single buzzer 37, and an alert operator may easily run four tests at once. This will make possible a far more rapid determination of the value of certain impregnating treatments, for example, as different percentages of impregnants may be incorporated in four otherwise identical specimens, and the specimen resisting penetration by the liquid for the longest period will be readily identified. Such a test would be useful for testing leather treated in different ways to be water-resistant, If it is desired to test many specimens at the same time, up to twenty or more, an annunciator board of known construction may be connected by wires to the several hammers, and a timer for each unit may be connected to run until the annunciator signal for that unit goes up on the board. Such details are within the skill of a competent craftsman used to working in telephone circuits. Another change within the scope of our invention would be the substitution of an ohmmeter for a buzzer.

Changes in the construction and relationship of the parts may be made, within the scope of the appended claims. In lieu of a pivoted arm, a cam-actuated weighted plunger falling directly down on the rotating anvil may be used, with the hammer at the contact end and the specimen attached thereto. The rotary anvil may be superseded by an oscillatory table with an external water supply. Or the arm shown may be pivoted near its center, with its actuating cam operating on one end; or the hammer may be near the center with the pivot at one end and the actuating cam operating on the other end.

For the purpose of determining the resistance of leather and other porous fabrics to penetration by gasoline, kerosene, lubricating oil, and other electrically non-conducting liquids, the apparatus may be employed without using the electrical signal circuit. In such cases penetration of the leather by the non-conducting liquid is ascertained visually.

Our method applies to each specimen a definite, reproducible force that is much less dependent upon the stiffness of the leather than the usual dynamic flexing method. Pounding on the specimen continues throughout the test, which yields realistic results because the slight abrading action, the straining of the fibers, and the compression factor tend to reproduce the effects of actual wearing of the specimen by a person in wet weather. Use of the described apparatus has shown very good correlation between repeated tests. The apparatus is easy to load and unload; end point detection is accurate; human error may be largely eliminated; and time and labor are saved.

Having described our invention, what we claim as new and desire to secure by Letters Patent is:

1. Apparatus for testing porous fabrics for their resistance to water penetration comprising a support; an anvil carried by the support; specimen-holding means movable toward and from the anvil; a supply of water for wetting the surface of the anvil; and an electrical circuit including said anvil, a conductor on said specimen-holding means in direct contact with a specimen so held, a source of electricity, and a signal; the parts being so positioned, connected and constructed that the signal is made evident when the porous fabric has absorbed enough water from the wetted anvil to complete the signal circuit.

2. Apparatus for testing porous fabrics for their resistance to water penetration comprising a support; an arm pivoted on the support; a specimen holder secured to the arm; an anvil fixed to the support; a supply of water for wetting the surface of the anvil; power-operated means for swinging the arm so as to strike the anvil intermittently against the specimen held by said holder, the specimen then being in direct contact on one side with said wetted surface; an electrical circuit including said anvil, a conductor on said arm in direct contact with the other side of the specimen a source of electricity, and a signal; the parts being so positioned connected and constructed that the signal is made evident when the porous fabric has absorbed enough water from the wetted anvil to complete the signal circuit.

3. Apparatus as claimed in claim 2, wherein the anvil is a power-rotated circular member having shallow transverse grooves in its periphery.

4. Apparatus as claimed in claim 2, wherein the conductor on said arm is a metallic hammer, and the power-operated means for swinging the arm is a cam shaped to cause a sudden movement of the arm causing the hammer to hit the specimen with the anvil receiving the blow.

5. Apparatus for simultaneously testing a plurality of porous fabrics for their resistance to water penetration comprising a support; a plurality of arms pivoted on the support; a specimen holder secured to each arm; a rotatable supporting shaft extending beneath the free ends of the arms; an anvil fixed to the supporting shaft beneath each arm; a supply of water for wetting the surface of the anvil that is contacted by the specimen; power-operated means for swinging the several arms so that each arm strikes the anvil intermittently with the specimen held by said holder, the specimen then being in direct contact on one side with said wetted surface; and electrical circuits including the several anvils, a conductor on each arm in direct contact with the other side of the specimen, a source of electricity and signal means; the parts being so positioned, and connected and constructed that a signal is made evident whenever any one of the porous fabrics has absorbed enough water from the wetted anvil to complete the signal circuit.

6. Apparatus as claimed in claim 5, wherein the power-operated means for swinging the several arms consists of a power shaft on which a plurality of cams are secured, each cam contacting one of the arms to swing it, the several cams being out of phase so that each arm is swung at a different instant from the other cams.

7. A device for dynamically testing leather and other porous fabrics for their resistance to water penetration, comprising a hard surface revolving member with a portion of whose periphery a specimen of the leather is in contact while being tested, means for removably supporting said specimen in such contacting position, means for providing a surface covering in the form of a film of water to said revolving member, an electric signalling circuit for said device including a source of electricity and a signal means with the revolving member being electrically connected into said circuit, and means disposed above the periphery of the revolving member for pressing a specimen intermittently against said periphery to increase the absorption of water of said specimen, said last-named means including a pin-supported metal hammer engaging said leather specimen above said revolving member and being electrically connected with the source of electricity and the signal means to thereby increase its conductivity to the extent of completing the circuit to said signal means to operate the same.

8. A device according to claim 7, wherein said revolving member is a metal wheel having grooves formed in its periphery and extending transversely thereof, whereby to impart a mild abrasion to the specimen concomitantly with the contact with the film of water.

References Cited in the file of this patent

UNITED STATES PATENTS

| | | |
|---|---|---|
| 1,525,495 | Carson | Feb. 10, 1925 |
| 1,537,179 | Moller | May 12, 1925 |
| 1,608,820 | Schaub | Nov. 30, 1926 |
| 2,012,762 | Kern | Aug. 27, 1935 |